United States Patent [19]
Gates et al.

[11] 3,958,332
[45] May 25, 1976

[54] CABLE SAW

[76] Inventors: Elmer L. Gates, 565 Middlebury, Sunnyvale, Calif. 94087; Richard K. Goodell, 2212 Wren Way, Campbell, Calif. 95008; Elmer Lee Gates, Jr., 1011 Narciso Court, San Jose, Calif. 95129

[22] Filed: Apr. 14, 1975

[21] Appl. No.: 567,651

[52] U.S. Cl. .................................. 30/380; 83/788; 83/830
[51] Int. Cl.² .................................. B27B 13/08
[58] Field of Search ............ 83/788, 830, 831, 832, 83/833; 145/31 R; 30/380

[56] References Cited
UNITED STATES PATENTS

| | | |
|---|---|---|
| 789,512 | 5/1905 | Waller .................................. 83/830 |
| 1,303,809 | 5/1919 | Lofgren .................................. 30/380 |
| 1,530,682 | 3/1925 | Lyman .................................. 30/380 X |
| 2,696,228 | 12/1954 | Bowen .................................. 30/380 |

*Primary Examiner*—Al Lawrence Smith
*Assistant Examiner*—J. C. Peters
*Attorney, Agent, or Firm*—Limbach, Limbach & Sutton

[57] ABSTRACT

A plurality of tubular, spaced apart cutting links are coaxially fastened to a continuous cable and are driven around a plurality of sprockets by a motor driven sprocket. Each cutting link includes cutting teeth at the forward end of the link and a chip or sawdust clearing edge at the rear of the link.

7 Claims, 8 Drawing Figures

CABLE SAW

BACKGROUND OF THE INVENTION

The invention relates to a band saw and more particularly to a tubular band saw.

It is well known in the prior art to form a band saw blade from a thin, flat, flexible ribbon with teeth mounted thereon. One of the great disadvantages of such band saws are that they are relatively directional, that is, the direction of cut cannot be changed easily simply by rotating the saw or the workpiece. Furthermore, even in band saws having a relatively narrow saw blade either the workpiece or the entire saw must be rotated in order to change the direction of cut.

In order to overcome this disadvantage, tubular band saws were developed, such as described in U.S. Pat. Nos. 152,970 and 2,043,603. In the device described in U.S. Pat. No. 152,970 a continuous tubular saw blade is described whereas in U.S. Pat. No. 2,043,603 a cable with a plurality of tubular cutting links thereon is described. In both prior art devices the cutting elements are driven by a pulley over which the saw blade travels. Moreover, in the device described in the latter patent the pulley moves the cable by pushing the cutting elements through the cut made in the material.

There are several disadvantages to such prior art tubular band saws. One disadvantage is that there is a tendency for sawdust and chips to cling to the cutting elements and thus to clog the saw blade. This problem is compounded by the fact that the saw blade passes over a pulley which further tends to compact the loose waste material into the cutting edges of the blade. Still another disadvantage of the band saw described in U.S. Pat. No. 2,043,603 is that because the pulley tends to push the saw blade through the workpiece there tends to be a flaring of the hole on the entry side of the cut in the workpiece. There is also the tendency of such saws to become unduly twisted because the lay of the cutting teeth is substantially continuous and in the same direction along the length of the blade. Still another disadvantage of the pulley drive system is that the saw blade is likely to slip and to wear out the pulley whenever the saw blade encounters a portion of the workpiece which is more difficult to cut.

SUMMARY OF THE INVENTION

The above and other disadvantages are overcome by the tubular band saw of the present invention which comprises a cable, a plurality of round cutting links secured coaxially to the cable at spaced intervals, a frame and rotatable sprocket wheels mounted on the frame for supporting the cable mounted cutting links, and motor driven sprocket means for rotating the cable mounted cutting links to cut the workpiece. In one preferred embodiment the tension in the cable is adjustable by means of a pair of diverging legs which are attached to the motor housing, the length of the legs being adjustable and the ends of the legs supporting the sprocket wheels, whereby adjustment of the length of the legs simultaneously adjusts the tension in the cutting link cable.

In the preferred embodiment the cutting links each have cutting teeth at their leading ends and an enlarged diameter section at their trailing ends to clear the cut made by the cutting teeth. The teeth of the sprocket wheels sequentially engage the cutting cable immediately behind each cutting link trailing end and abut the enlarged diameter section of each cutting link. The enlarged diameter section of the cutting link tapers toward the trailing direction and the teeth on the sprocket wheels are beveled, in order to prevent the cutting link trailing end from digging into the teeth of the sprocket wheel as it leaves the sprocket wheel during rotation.

In order to prevent twisting of the cable, the lay of the cutting teeth on each sequential length is alternated.

It is therefore an object of the present invention to provide a sprocket wheel driven tubular band saw.

It is another object of the invention to provide a tubular band saw which does not clog with sawdust or chips from the workpiece.

It is still another object of the invention to provide a tubular band saw wherein the sawing cable can be moved into the workpiece at any angle and thereafter the direction of sawing changed without binding the blade.

It is a still further object of the invention to provide a portable tubular type chain saw.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
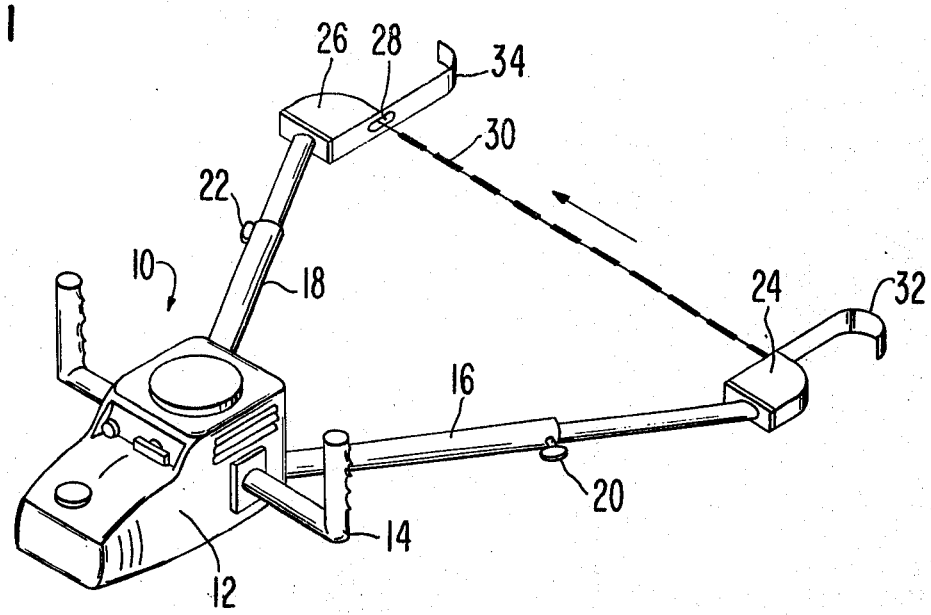
FIG. 1 is a perspective view of a tubular cable saw according to a preferred embodiment of the invention.
Figure 8:
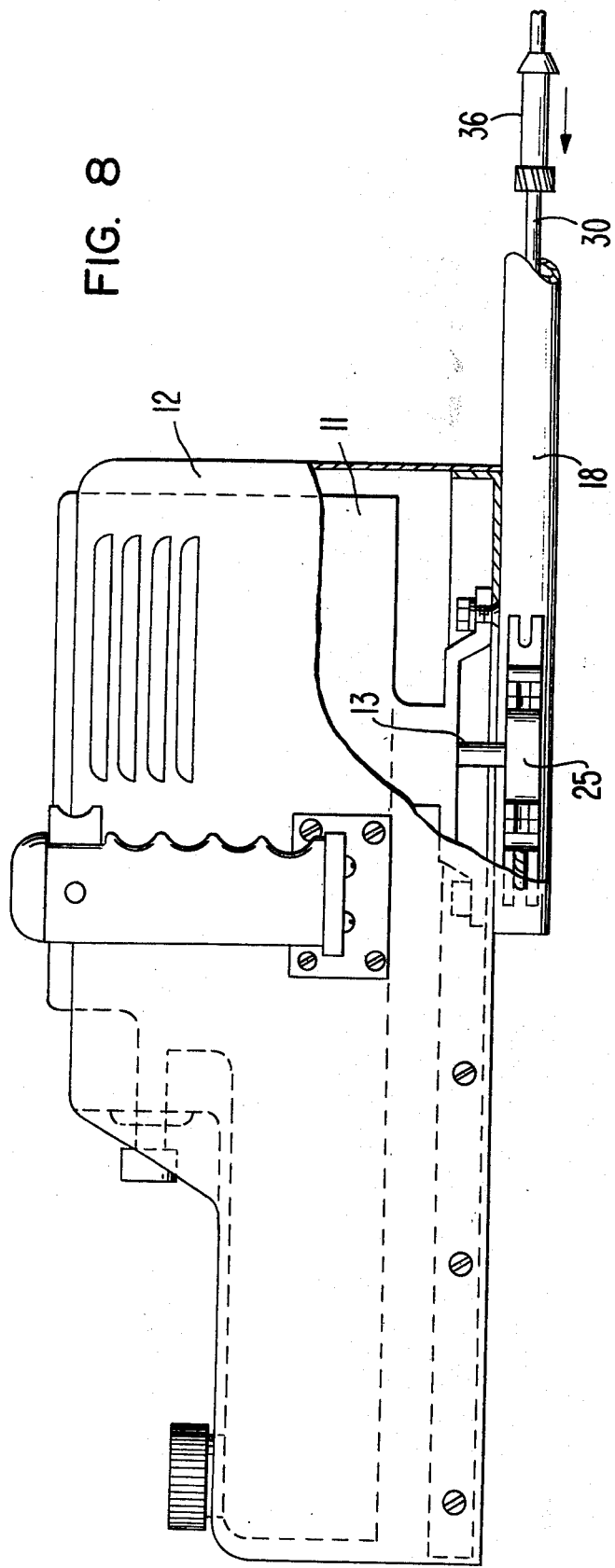
FIG. 8 is a side view, with portions broken away, of the motor housing for the cable saw of the invention.

Referring now more particularly to FIGS. 1 and 8 there is illustrated a motor powered tubular saw 10 according to one embodiment of the invention. The motor 11 for the saw is contained within a housing 12 having a pair of spaced apart hand grips 14 mounted on opposite sides of the housing 12 for holding the saw. A pair of spaced apart, hollow arms 16 and 18 are rigidly mounted to the housing 12 and diverge outwardly from it. The arms 16 and 18 are telescoping and therefore are adjustable in length by means of thumbscrews 20 and 22, respectively, which set the lengths of the arms 16 and 18.

On the ends of the arms 16 and 18 distal from the motor housing 12 are mounted sprocket wheel assemblies 24 and 26, respectively. The sprocket wheel assemblies 24 and 26 are substantially identical and therefore only one will be described in detail. The sprocket wheel assemblies are provided with apertures 28 through which a tubular cable saw 30 passes between the two sprocket assemblies 24 and 26. In order to guard against injury which might be caused by the lashing of the tubular cable saw 30 if it should break, a pair of curved guides 32 and 34 are mounted on the sprocket assemblies 24 and 26, respectively, and they are shaped so as to curve outwardly with respect to the saw 30. As indicated by the arrow depicted in FIG. 1, the cable saw 30 rotates in a counterclockwise direction.

Figure 2:
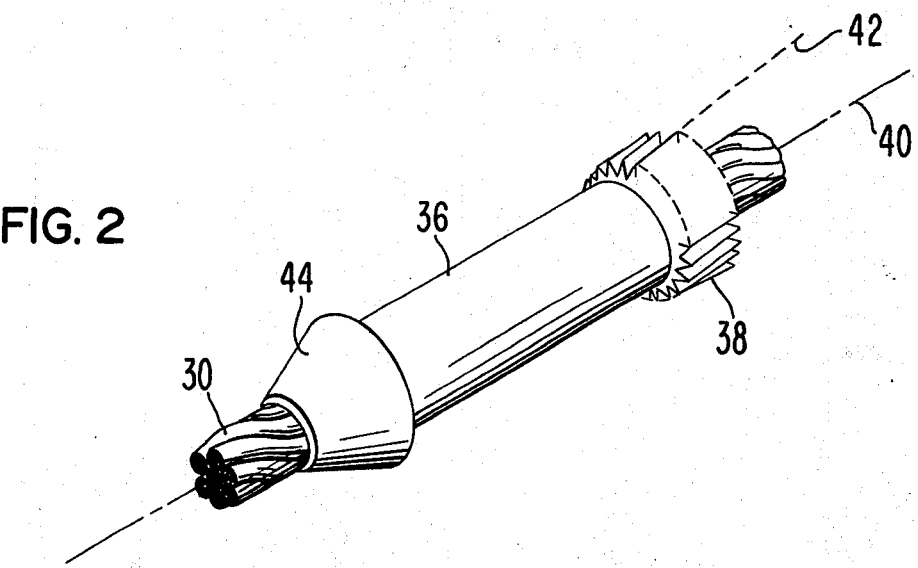
FIG. 2 is an enlarged perspective view of a cutting link of the saw depicted in FIG. 1.

Referring now more particularly to FIG. 2, one of the cutting links of the cable 30 will be described in greater detail. The cutting link 36 is mounted coaxially on the cable 30 either by being crimped onto the cable or by being inductively brazed. The cable 30 is made of stranded steel. At the leading edge of the cutting link 36 there are provided a plurality of cutting teeth 38 in the form of parallel, raised ridges. The cutting teeth 38 are slightly canted with respect to the longitudinal axis 40 of the cutting link 36. Thus the longitudinal axis 42 of any given cutting tooth forms an acute angle with the longitudinal axis 40 of the cutting link 36. This cant of the cutting teeth is referred to as the lay of the cutting teeth. Successive cutting links along the cable 30 have opposite lays so that as the force of the cutting teeth 38 reacting on the workpiece tend to twist the cable in one direction the forces acting on succeeding cutting links twist the cable in the opposite direction so that no net twist is imparted to the cable 30.

At the trailing end of the cutting link 36 there is an enlarged diameter portion 44 which tapers in the trailing direction. The purpose of the enlarged diameter portion 44 is to clear away chips and sawdust from the cut made by the cutting teeth 38 at the leading end. The reason that the enlarged diameter portion 44 is tapered is so that it will not dig into the sprocket teeth in passing around the sprocket wheels as will be explained in greater detail hereinafter.

Figure 3:
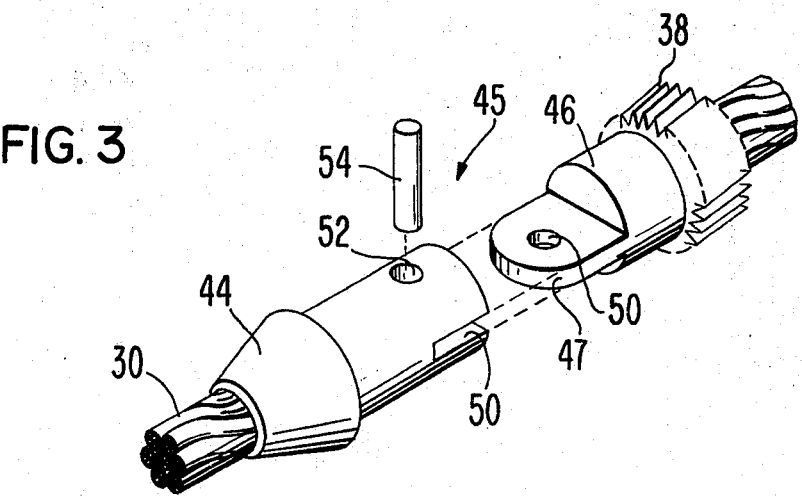
FIG. 3 is an enlarged perspective view of a connecting link of the saw depicted in FIG. 1.

Referring now more particularly to FIG. 3 a connecting link 45 is shown which has the same basic structure as the cutting link 36, that is, it has cutting teeth at its leading end and a chip clearing portion at its trailing end. The connecting link 45 is divided into two parts. The first part 46 includes the cutting teeth 38 and further includes a protruding tongue portion 47 having a center hole 50 therein. The trailing portion 48 of the connecting link has a notch 50 at its leading end to receive the tongue 47 of the leading portion 46. A hole 52 in the leading end of the portion 48 receives a pin 54 which passes through the holes 52 and 50 to lock the tongue 47 in the notch 50. The pin 54 may be force fitted into the hole 52 or otherwise more or less permanently engaged therein.

Figure 4:
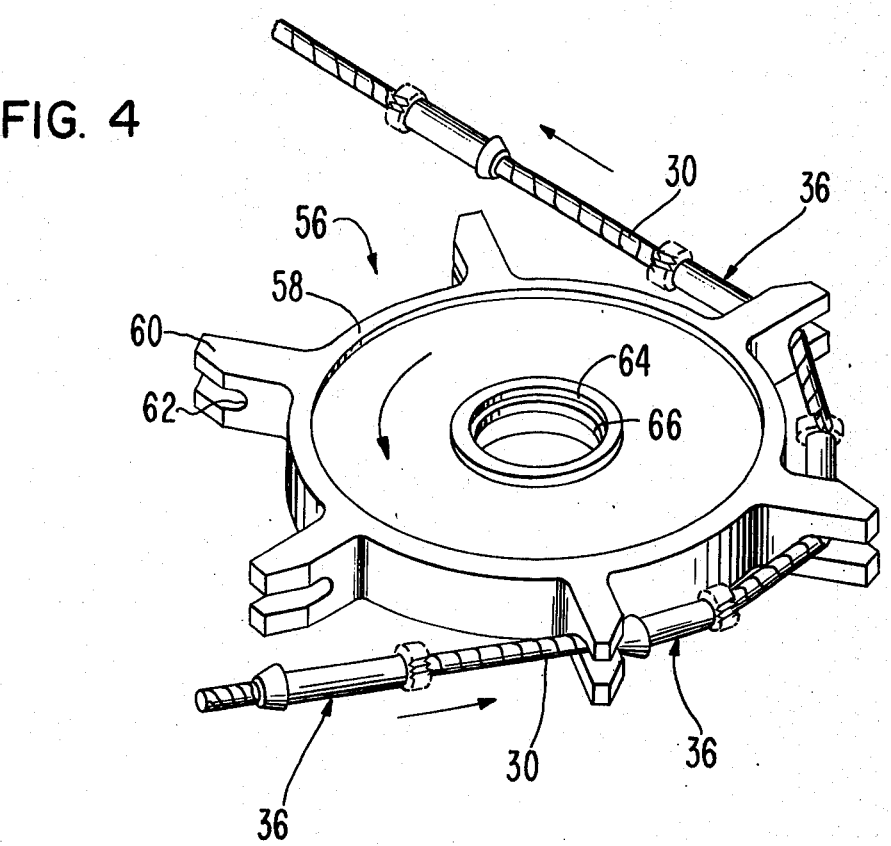
FIG. 4 is an enlarged perspective view of a sprocket wheel together with a portion of the cutting cable and cutting links of the saw depicted in FIG. 1.

Referring now more particularly to FIG. 4 the sprocket wheel supporting means 56 for cable 30 is illustrated. It will be understood that the structure depicted in FIG. 4 is substantially identical for either of the sprocket wheel assemblies 24 or 26.

The sprocket wheel supporting means 56 include a sprocket wheel 58 having a plurality of beveled sprockets 60 projecting from its outer circumference. As depicted in FIG. 4 the sprocket wheel 58 is rotated in the counterclockwise direction with the leading edge of the sprocket 60 being beveled. U-shaped channels 62 are circumferentially cut in the sprockets 60. The diameter of the channel 62 is just slightly greater than the diameter of the cable 30 so that the cable 30 is carried in the channel 62 of each sprocket as the wheel 58 is rotated.

The leading face of each sprocket 60 abuts against the rear face of the enlarged trailing portion 44 of each cutting link 36. The purpose of the bevel in the sprocket 60 is to prevent the cutting link 36 from digging into the sprocket tooth as it leaves the sprocket wheel after having completed a portion of a revolution about the wheel.

The sprocket teeth 60 are spaced approximately twice the length of a cutting link apart so that the cutting teeth 38 are never in contact with the sprocket wheel 58 or the sprocket teeth 60. This feature gives a longer life to the cutting teeth 38 over prior art embodiments wherein the cutting links pass directly into contact with the pulley support. Still another advantageous feature of the sprocket wheel support mechanism is that as the cutting link and the associated adjacent cable portion 30 leave the sprocket tooth 60 a slight snap is given to the cutting link 36 which shakes loose any sawdust or other material from the cutting teeth. Moreover, the sprocket wheel 58 does not tend to pack the sawdust into the cutting teeth 38 as sometimes happens in prior art embodiments which utilize a pulley wheel.

The hub of the sprocket wheel 58 is provided with a reinforced hole 64 which has a reduced diameter section or shoulder 66 at its center. As will be explained in greater detail hereinafter, the opposite halves of the hole 64 divided by the shoulder 66 receive sleeve bearings which turn on an axle.

As was stated above, the sprocket wheel support means include three sprocket wheel assemblies of the type shown in FIG. 4. These assemblies are shown as units 24 and 26 in FIG. 1. The third wheel assembly 25 is substantially identical to that shown in FIGS. 4 and 5 and resides in the motor housing 12 on an axle 13 driven by the motor 11 (FIG. 8). Such a motor may be either electrically driven or powdered by an internal combustion engine.

Figure 5:
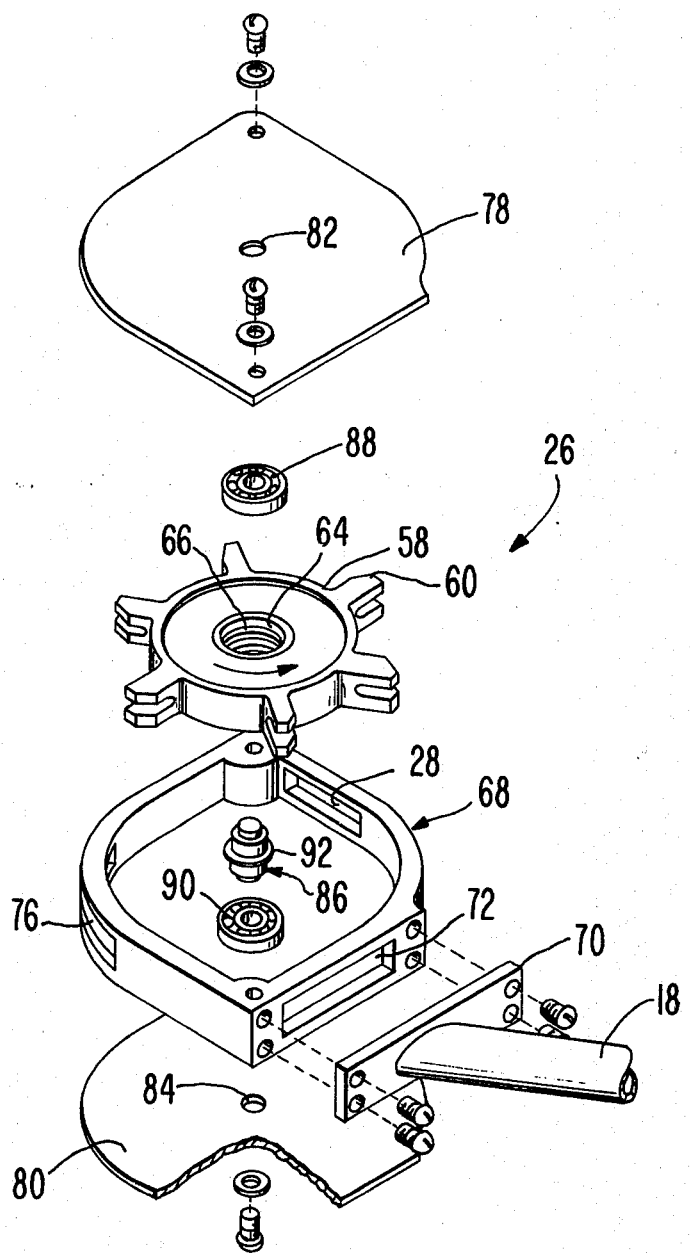
FIG. 5 is an enlarged, exploded, perspective view of one of the sprocket wheel assemblies of the saw depicted in FIG. 1.

Referring now more particularly to FIG. 5 the sprocket wheel 58 is contained within a housing 68 which is bolted to a flange 70 mounted on the distal end of the support arm 18. An exit opening 72 is provided in the portion of the housing 68 which is immediately adjacent the flange 70. The tube 18 is hollow and the cable 30 (not shown in FIG. 5) passes through the opening 28 and counterclockwise around the sprocket wheel 58 to exit through the hole 72 in the housing 68 and into the hollow support arm 18. It should be noted that while FIG. 5 depicts the sprocket wheel assembly 26 the sprocket wheel assembly 24 is substantially identical and therefore will not be described in detail. The cable entry opening 28 is approximately 90° to the exit hole 72.

Another hole 76 is provided in the wall of the housing 68 more or less diametrically opposite to the entry hole 28. The purpose of the hole 76 is to allow the escape of sawdust flung off the sprocket wheel 58 by centrifugal force as the cable passes around the sprocket wheel.

The housing 68 includes an upper end plate 78 and a lower end plate 80 which are bolted to the housing wall. The upper end plate 78 includes a center hole 82 and the lower end plate 80 includes a center hole 84. An axle 86 is provided with reduced diameter end portions which fit into the holes 82 and 84 and is thus held between the two end plates 78 and 80 when they are bolted to the housing 68. An upper sleeve bearing 88 and a lower sleeve bearing 90 are fitted over the ends of the axle 86 and are kept apart by an enlarged diameter portion 92 in the center of the axle and the reduced diameter portion 66 of the sprocket wheel hole 64. The bearings 88 and 90 thus fit in opposite sides of the hole 64 in the sprocket wheel and rotatably support the sprocket wheel 58 on the axle 86.

Figure 6:
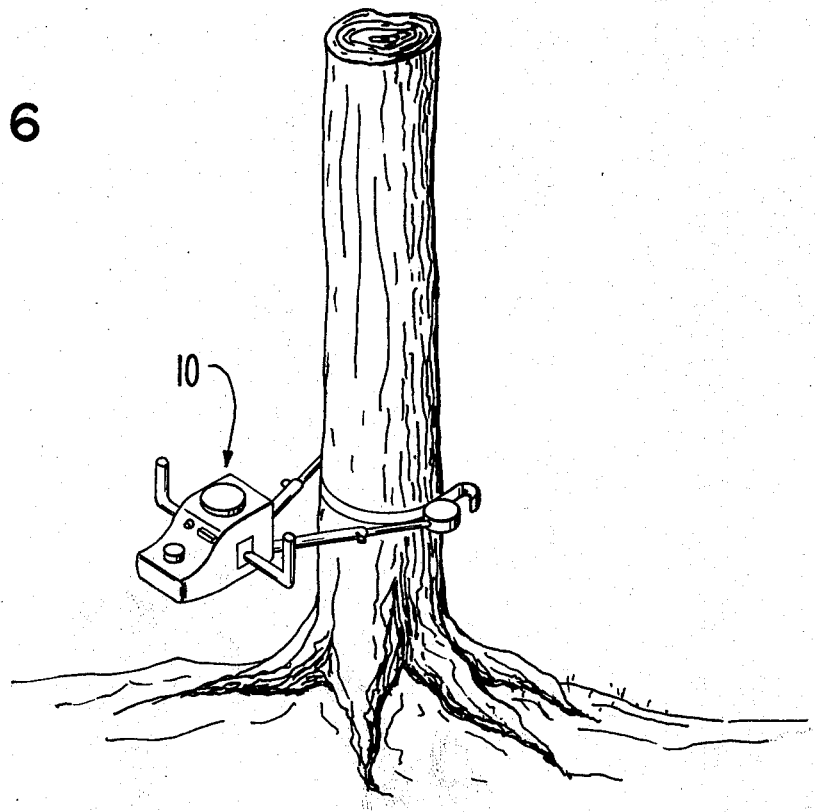
FIG. 6 is an illustration of the use of the saw depicted in FIG. 1 for felling timber.
Figure 7:
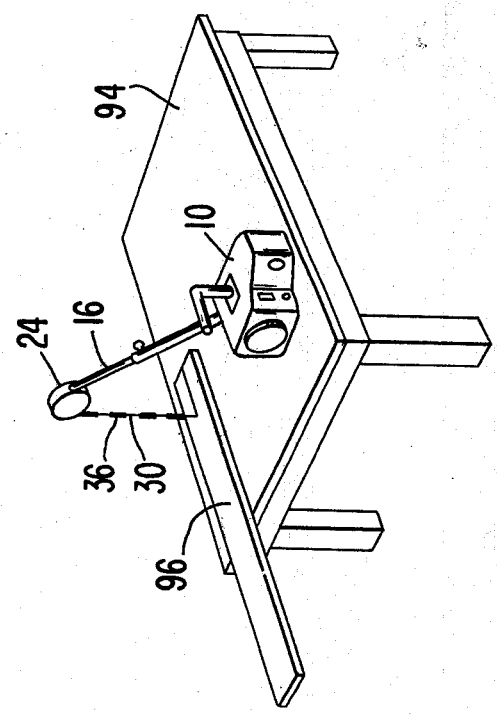
FIG. 7 is an illustration of the use of the saw depicted in FIG. 1 as a table saw.

The cable saw of the invention has wide applications both as a portable saw and as a fixed saw. Thus, as viewed in FIG. 6 the saw 10 may be used as a portable cable saw for cutting timber or, as best viewed in FIG. 7, it may be mounted on a stationary table 94 with one of the support arms 16 projecting above the table and the other support arm 18 projecting below the table. The cable saw passes through a slot (not shown) in the table and the workpiece 96 is moved against the saw blade to cut. Since the saw blade is tubular, the workpiece 96 may be moved in any direction against the saw blade without the necessity of rotating the saw housing 10. Furthermore, the workpiece 96 may be tilted or canted at an angle without the necessity of any adjustment of the saw 10.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

We claim:

1. An improved cable saw of the type having a flexible cable, a plurality of tubular cutting links threaded on the cable at spaced apart intervals and motor means for driving the links in a forward direction, wherein the improvement comprises
    nonrotatably attaching the cutting links to the cable, the cutting links having cutting teeth at their leading ends and an enlarged diameter section adjacent their trailing ends to clear the cut made by the cutting teeth, and the motor means includes a motor driven, slotted sprocket wheel whose slotted sprockets carry the cable in the sprocket wheel slot and sequentially engage the cable immediately behind each cutting link trailing end and abut the enlarged diameter section of each cutting link to pull the cable.

2. An improved cable saw of the type having a flexible cable, a plurality of spaced apart, tubular cutting links mounted coaxially on the cable, rotatable means for supporting the cable in tension, and motor means for driving the cutting links in a forward direction, wherein the improvement comprises
securely attaching the cutting links to the cable, a plurality of sprocket wheels for supporting the cable in tension, each sprocket wheel having a plurality of sprocket teeth projecting from its circumference, each sprocket tooth having a U-shaped channel therein in the circumferential direction for carrying the cable with the cutting links out of contact with the circumference of the sprocket wheel, the cutting links being spaced apart by a distance which is greater than the length of the cutting links and the U-shaped channels being wider than the cable's diameter and narrower than the cutting link's diameter, means for rotatably mounting the sprocket wheels, motor means for driving one of the sprocket wheels so that the sprocket teeth of the driven wheel sequentially engage the cable and abut each cutting link trailing end to pull the cable about the sprocket wheels, whereby the cutting links are driven about the sprocket wheels and are each given a slight snap in leaving each sprocket wheel to clear debris from the cutting link.

3. An improved cable saw as recited in claim 2 wherein the cutting links each have cutting teeth at their leading ends and an enlarged diameter section at their trailing ends to clear the cut made by the cutting teeth.

4. An improved cable saw as recited in claim 3 wherein the enlarged diameter section of the cutting link tapers toward the trailing end.

5. An improved cable saw as recited in claim 3 wherein the leading face, with respect to the direction of cable travel, of each sprocket tooth is beveled, whereby the cutting links are prevented from digging into the sprocket teeth when leaving each sprocket wheel.

6. An improved cable saw as recited in claim 2 wherein the cutting teeth make an oblique angle with the longitudinal axis of the cutting link and the successive cutting links along the cable have opposite lays to prevent twisting of the cable.

7. An improved cable saw as recited in claim 2 further comprising a hub housing for the motor driven sprocket wheel, a pair of hollow supports, each rigidly mounted at one end to the hub housing and diverging outwardly from it, the supports being telescopically adjustable in length, two of the slotted sprocket wheels being rotatably mounted on the free ends of the diverging supports and with the cable passing through the hollow supports, whereby the tension in the cable is adjustable by adjusting the lengths of the diverging supports.

* * * * *